United States Patent
Salvador et al.

(10) Patent No.: US 9,668,213 B2
(45) Date of Patent: May 30, 2017

(54) METHODS AND SYSTEMS FOR IMPROVING WIRELESS NETWORK CAPACITY

(71) Applicants: Omar Salvador, Wheaton, IL (US);
Keith Stanley, Warrenville, IL (US);
Yang Yang, Morris Plains, NJ (US)

(72) Inventors: Omar Salvador, Wheaton, IL (US);
Keith Stanley, Warrenville, IL (US);
Yang Yang, Morris Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 140 days.

(21) Appl. No.: 14/501,314

(22) Filed: Sep. 30, 2014

(65) Prior Publication Data

US 2016/0095059 A1    Mar. 31, 2016

(51) Int. Cl.
*H04W 52/02* (2009.01)
*H04W 28/02* (2009.01)
*H04W 76/04* (2009.01)
*H04L 12/801* (2013.01)

(52) U.S. Cl.
CPC ......... *H04W 52/0222* (2013.01); *H04L 47/29* (2013.01); *H04W 28/0289* (2013.01); *H04W 76/048* (2013.01)

(58) Field of Classification Search
None
See application file for complete search history.

(56) References Cited

U.S. PATENT DOCUMENTS 9,215,746 B1 * 12/2015 Climaco .............. H04W 76/046
2002/0172178 A1 * 11/2002 Suzuki ................ H04W 76/068
370/338

(Continued)

FOREIGN PATENT DOCUMENTS

CN  WO 2014085995 A1 *  6/2014  ........ H04W 52/0258
JP  WO 2014006815 A1 *  1/2014  ......... H04W 76/046

(Continued)

OTHER PUBLICATIONS

"3rd Generation Partnership Project; Technical Specification Group Services and System Aspects; Study on Machine-Type Communications (MTC) and Other Mobile Data Applications Communications Enhancements (Release 12)." *Technical Report* (2013-2012).

*Primary Examiner* — Chi H Pham
*Assistant Examiner* — Vladislav Agureyev
(74) *Attorney, Agent, or Firm* — Harness, Dickey & Pierce, P.L.C.

(57) ABSTRACT

A core network entity includes a core network entity processing circuit. The core network entity processing circuit calculates a plurality of dormancy timer adjustment parameters in response to a received service request from a user equipment, and adjusts a dormancy timer for the user equipment based on (i) at least one load condition for the wireless network, and (ii) a comparison between each of the plurality of dormancy timer adjustment parameters and a corresponding one of a plurality of dormancy timer adjustment parameter threshold values. The core network entity then outputs the adjusted dormancy timer to a base station serving the user equipment.

19 Claims, 4 Drawing Sheets

(56) References Cited

U.S. PATENT DOCUMENTS

| | | | | |
|---|---|---|---|---|
| 2003/0210658 A1* | 11/2003 | Hernandez | H04W 52/0232 | 370/311 |
| 2007/0259673 A1* | 11/2007 | Willars | H04W 52/0225 | 455/453 |
| 2011/0319064 A1* | 12/2011 | Lenart | H04W 52/0225 | 455/418 |
| 2012/0129509 A1* | 5/2012 | Chan | H04W 52/0229 | 455/418 |
| 2012/0281561 A1* | 11/2012 | Shukla | H04W 76/068 | 370/252 |
| 2012/0287815 A1* | 11/2012 | Attar | H04B 7/0871 | 370/253 |
| 2013/0130693 A1* | 5/2013 | Salvador | H04W 48/20 | 455/437 |
| 2013/0208638 A1* | 8/2013 | Hsu | H04W 52/0225 | 370/311 |
| 2014/0064134 A1* | 3/2014 | Huang | H04W 76/068 | 370/253 |
| 2015/0003361 A1* | 1/2015 | Palat | H04W 52/0258 | 370/329 |
| 2015/0055565 A1* | 2/2015 | Kotecha | H04W 76/068 | 370/329 |
| 2015/0099556 A1* | 4/2015 | Xi | H04W 76/068 | 455/509 |
| 2015/0173013 A1* | 6/2015 | Iwai | H04W 52/02 | 455/418 |
| 2015/0282009 A1* | 10/2015 | Iwai | H04W 24/10 | 455/436 |
| 2015/0312961 A1* | 10/2015 | Sun | H04W 52/0258 | 370/330 |
| 2015/0319744 A1* | 11/2015 | Jung | H04W 24/10 | 370/328 |
| 2015/0327167 A1* | 11/2015 | Ljung | H04W 76/068 | 370/311 |
| 2015/0351151 A1* | 12/2015 | Huang | H04W 36/0083 | 370/252 |

FOREIGN PATENT DOCUMENTS

| | | | | |
|---|---|---|---|---|
| JP | WO 2014054237 A1 * | 4/2014 | | H04W 24/10 |
| JP | WO 2014167759 A1 * | 10/2014 | | H04W 52/0216 |
| KR | WO 2014084675 A1 * | 6/2014 | | H04W 24/10 |

\* cited by examiner

METHODS AND SYSTEMS FOR IMPROVING WIRELESS NETWORK CAPACITY

BACKGROUND

One issue that network operators face with current 3rd Generation Partnership Project Long-Term Evolution (3GPP LTE) deployments is traffic variability. Conventionally, Evolved Packet Core (EPC) network nodes and eNBs are configured based on average traffic estimates including, for example, user equipment (UE) connection rates, UE traffic, percent time connected, handover events, paging rates, etc. However, at different times and different locations, one or more of these traffic parameters often exceeds the "average" traffic estimate, especially at the eNB level. This increase in traffic may cause overload conditions, which may result in degradation of Key Performance Indicators (KPIs). In some cases, the increase in traffic may cause denial of service to UEs, which then triggers UEs to access 3G networks. Causing UEs to access 3G networks may cause unacceptable overload conditions on those networks as well.

Another issue that network operators face with respect to 3GPP LTE deployments is the relatively short battery life associated with current 3GPP LTE devices (e.g., smartphones or other wireless devices).

The length of time during which a UE maintains an open Radio Resource Control (RRC) connection with the network while the UE is inactive (referred to sometimes as the inactivity or dormancy timer) can impact both traffic variability and UE battery life. Conventionally, the same inactivity timer value is configured, for all the UEs connected to an eNB. If the inactivity timer value is short, then the RRC connections for the UEs are released more frequently, which may increase the number of RRC connection attempts by the UE. The increased number of RRC connection attempts can impact signaling traffic in the network.

Since power consumption at a UE is higher when maintaining an open RRC connection with the network, a relatively long inactivity timer for a UE increases UE battery usage, thereby decreasing UE battery life.

Relatively long inactivity timers for UEs also increase the probability of handovers between cells, which requires relatively high processing overhead and increases the likelihood that an overload condition occurs at an eNB because of the increased probability of a relatively high number of simultaneous connections at an eNB.

Operators are looking for a more flexible and balanced solution to optimize a network taking into account variability of traffic patterns during different busy periods and address user device battery life concerns.

SUMMARY

At least one example embodiment provides an evolved packet core (EPC) network entity. According to at least this example embodiment, the EPC network entity includes: a core network entity processing circuit; a memory; and a communication interface. The core network entity processing circuit is configured to: calculate a plurality of dormancy timer adjustment parameters in response to a received service request from the user equipment, the plurality of dormancy timer adjustment parameters including a service request rate and connection time change parameter for the user equipment; and adjust a dormancy timer for the user equipment based on (i) at least one load condition for a wireless network, and (ii) a comparison between each of the plurality of dormancy timer adjustment parameters and a corresponding one of a plurality of dormancy timer adjustment parameter threshold values. The memory is operatively connected to the core network entity processing circuit, and configured to store at least one of the plurality of dormancy timer adjustment parameters. The communication interface is operatively coupled to the core network entity processing circuit, and configured to output the adjusted dormancy timer to a base station serving the user equipment.

At least one other example embodiment provides a method for improving wireless network capacity. According to at least this example embodiment, the method includes: calculating, at a core network entity processing circuit, a plurality of dormancy timer adjustment parameters in response to a received service request from a user equipment, the plurality of dormancy timer adjustment parameters including a service request rate and connection time change parameter for the user equipment; adjusting, at the core network entity processing circuit, a dormancy timer for the user equipment based on (i) at least one load condition for the wireless network, and (ii) a comparison between each of the plurality of dormancy timer adjustment parameters and a corresponding one of a plurality of dormancy timer adjustment parameter threshold values; and outputting, by a communication interface, the adjusted dormancy timer to a base station serving the user equipment.

At least one other example embodiment provides a tangible and/or non-transitory computer-readable storage medium storing computer-executable instructions that, when executed on a computer device at a core network entity, cause the core network entity to perform a method for improving wireless network capacity. According to at least this example embodiment, the method includes: calculating, at a core network entity processing circuit, a plurality of dormancy timer adjustment parameters in response to a received service request from a user equipment, the plurality of dormancy timer adjustment parameters including a service request rate and connection time change parameter for the user equipment; adjusting, at the core network entity processing circuit, a dormancy timer for the user equipment based on (i) at least one load condition for the wireless network, and (ii) a comparison between each of the plurality of dormancy timer adjustment parameters and a corresponding one of a plurality of dormancy timer adjustment parameter threshold values; and outputting, by a communication interface, the adjusted dormancy timer to a base station serving the user equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
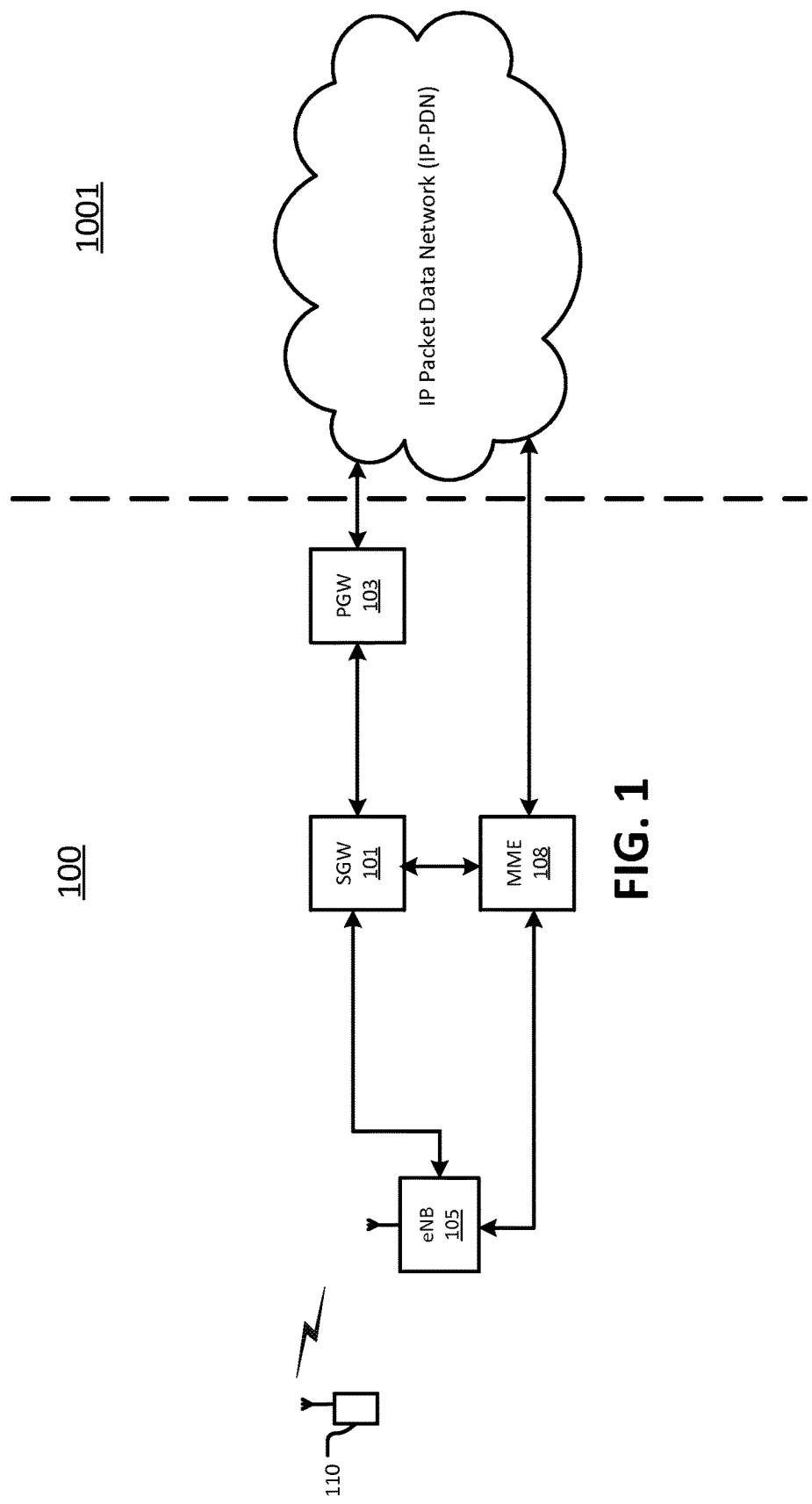
FIG. 1 illustrates a portion of an Evolved Packet System (EPS).

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, such as eNBs; and/or existing Evolved Packet Core (EPC) network elements, such as mobile management entities (MMEs), packet data network (PDN) gateways (PGWs), serving gateways (SGWs), servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all functionally associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to network, whereas downlink (or forward link) transmissions refer to transmissions from network to UE.

According to example embodiments, the PGWs, SGWs, MMEs, UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

FIG. 1 illustrates a portion of an Evolved Packet System (EPS). The EPS includes an Internet Protocol (IP) Connectivity Access Network (IP-CAN) 100 and an IP Packet Data Network (IP-PDN) 1001.

Referring to FIG. 1, the IP-CAN 100 includes: a serving gateway (SGW) 101; a packet data network (PDN) gateway (PGW) 103; a mobility management entity (MME) 108, and an eNB 105. Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for UEs including UE 110. For the purpose of clarity, only one UE is illustrated in FIG. 1. However, any number of UEs may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between $3^{rd}$ Generation Partnership Project Long-Term Evolution (3GPP LTE) and other 3GPP technologies. For idle UEs, the SGW 101 terminates the downlink data path and triggers paging when downlink data arrives for UEs.

The PGW 103 provides connectivity between the UE 110 and the external packet data networks (e.g., the IP-PDN) by being the point of entry/exit of traffic for the UE 110. As is known, a given UE may have simultaneous connectivity with more than one PGW for accessing multiple PDNs.

The PGW 103 also performs policy enforcement, packet filtering for UEs, charging support, lawful interception and packet screening, each of which are well-known functions. The PGW 103 also acts as the anchor for mobility between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Still referring to FIG. 1, the eNB 105 is also operatively coupled to the MME 108. The MME 108 is the control-node for the EUTRAN, and is responsible for idle mode UE paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs by interacting with a Home Subscriber Server (HSS), which is not shown in FIG. 1.

Non Access Stratum (NAS) signaling terminates at the MME 108, and is responsible for generation and allocation of temporary identities for UEs. The MME 108 also checks the authorization of a UE to camp on a service provider's Public Land Mobile Network (PLMN), and enforces UE roaming restrictions. The MME 108 is the termination point in the network for ciphering/integrity protection for NAS signaling, and handles security key management.

The MME 108 also provides control plane functionality for mobility between LTE and 2G/3G access networks with the S3 interface from the SGSN (not shown) terminating at the MME 108. The MME 108 also terminates the S6a interface to the home HSS for roaming UEs.

In addition to the functionality discussed above, which is generally well-known, according to at least some example embodiments the MME 108 also performs methods for improving and/or optimizing wireless network capacity. With regard to FIG. 1, in one example the MME 108 adjusts a dormancy timer for the UE 110 based on (i) at least one load condition for the wireless network, and (ii) a comparison between each of a plurality of dormancy timer adjustment parameters and a corresponding one of a plurality of dormancy timer adjustment parameter threshold values. The MME 108 then outputs the adjusted dormancy timer to the eNB 105 serving the UE 110. As discussed herein, the dormancy timer may also be referred to as an inactivity timer or a dormancy timer threshold value, which is used by the eNB 105, as specified in the 3GPP specifications, to release the RRC connection. For example, if the dormancy timer is set at 10 seconds, then the eNB 105 will release an RRC connection for a UE after 10 seconds of inactivity on the downlink and uplink user data traffic channels.

The at least one load condition for the wireless network may include: a messaging overload condition at the eNB 105; a connected users overload condition at the eNB 105; and a core network messaging overload condition. The plurality of dormancy timer adjustment parameters may include at least a NAS service request rate SR_RATE and connection time change parameter $\Delta_{CT}$ for the UE 110. Each of the NAS service request rate SR_RATE and connection time change parameter $\Delta_{CT}$ will be discussed in more detail later.

In response to receiving the adjusted dormancy timer, the eNB 105 adjusts connection time durations for the UE 110 thereby optimizing capacity of the wireless network while taking into account variability of traffic patterns during different busy periods and addressing user device battery life concerns. In a more specific example, the eNB 105 utilizes the received dormancy timer as the dormancy timer for a next RRC connection by the UE 110. According to at least some example embodiments, dormancy timers are assigned to UEs on a per-UE and/or per-RRC connection basis, rather than a per-eNB basis. As a result, each UE attached to a given eNB may have a different dormancy timer that triggers release of the RRC connection for the UE.

The methods performed at the MME 108 and the eNB 105 discussed above will be described in more detail later with regard to FIGS. 3 and 4.

Figure 2:
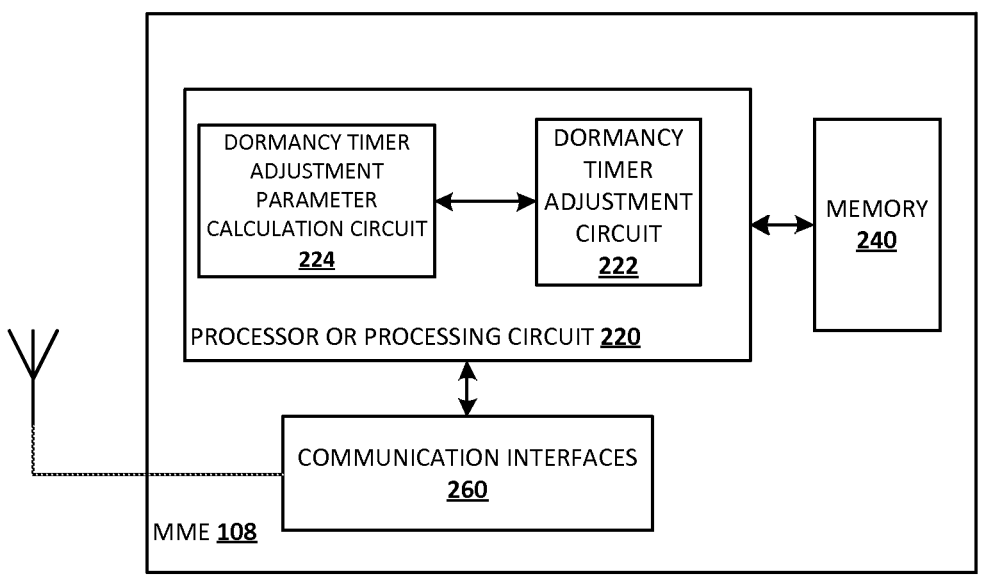
FIG. 2 is a block diagram illustrating an example embodiment of a mobility management entity (MME).

FIG. 2 is a block diagram illustrating a more detailed example embodiment of the MME 108 shown in FIG. 1.

Referring to FIG. 2, the MME 108 includes: a memory 240; a MME processing circuit 220; and communication interfaces 260. The MME processing circuit 220 may also be referred to as a MME processor, a core network entity processing circuit, an EPC entity processing circuit, etc.

The MME processing circuit 220 is operatively coupled to the memory 240 and the communication interfaces 260.

The MME processing circuit 220 includes a dormancy timer adjustment parameter calculation circuit 224 and a dormancy timer adjustment circuit 222. The dormancy timer adjustment parameter calculation circuit 224 is operatively coupled to the dormancy timer adjustment circuit 222. The dormancy timer adjustment circuit 222 may also be referred to as an inactivity timer adjustment circuit 222. The dormancy timer adjustment parameter calculation circuit 224 may also be referred to as an inactivity timer adjustment parameter calculation circuit 224.

Still referring to FIG. 2, the communication interfaces 260 include various interfaces including one or more transmitters/receivers connected to one or more antennas to transmit/receive (wireline and/or wirelessly) control signals via a control plane or interface to other EPC network elements and/or RAN elements.

As discussed in more detail later, the memory 240 may store, inter alia, network status and UE activity history information (also referred to as a signaling event history information) for UEs attached to the eNBs associated with the MME 108. The memory 240 may also store status indicators indicating messaging overload conditions and connected users overload conditions for eNBs, as well as messaging overload conditions for the EPC.

Example operation of the MME 108 as well as components thereof will be discussed in more detail below with regard to FIG. 3.

Figure 3:
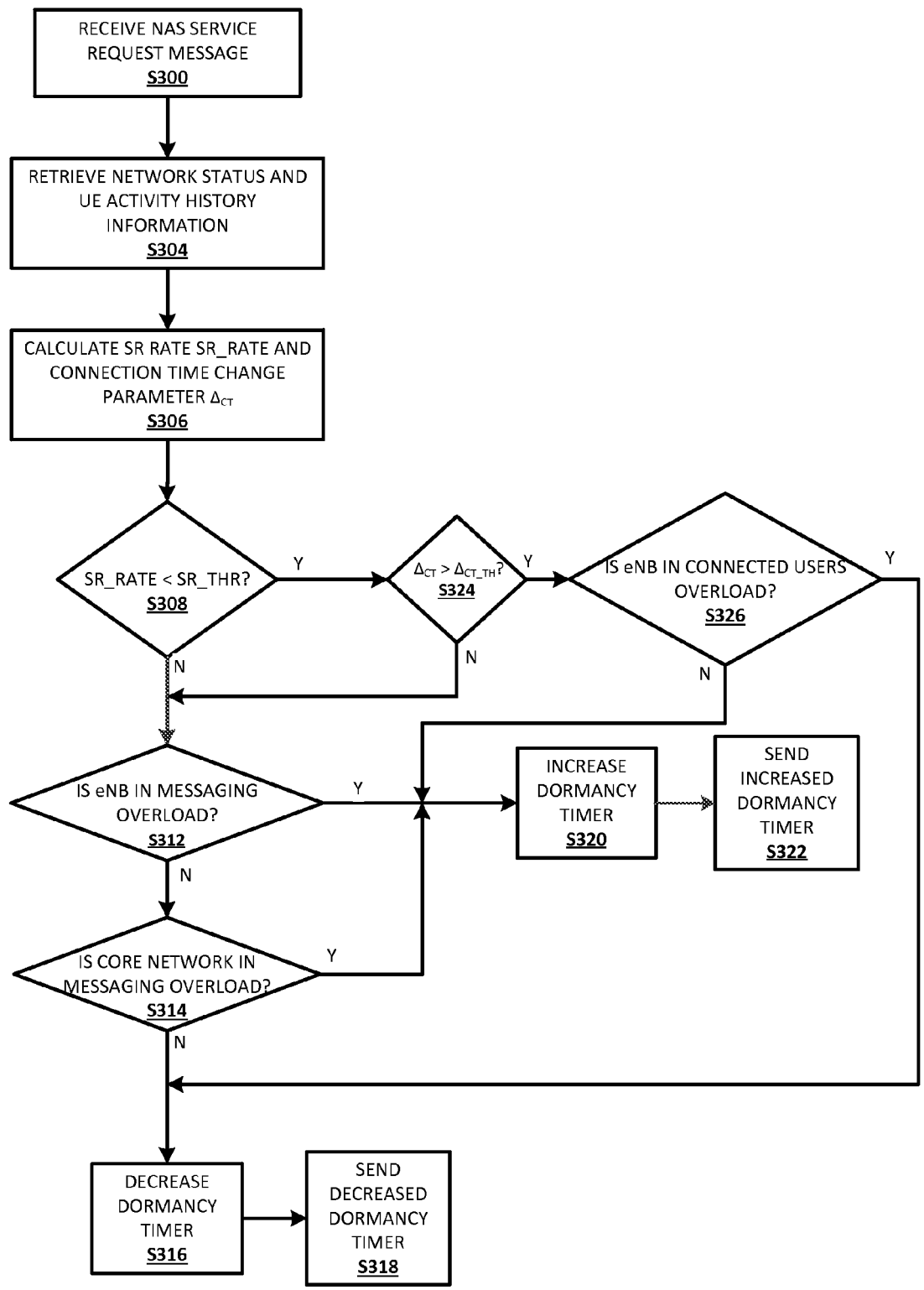
FIG. 3 is a flow chart illustrating a method for improving wireless network capacity according to an example embodiment.

FIG. 3 is flow chart illustrating an example embodiment of a method for improving wireless network capacity. For example purposes, the method shown in FIG. 3 will be discussed with regard to the EPS shown in FIG. 1 and the MME 108 shown in FIG. 2. However, it should be understood that methods according to example embodiments may be implemented in conjunction with other networks and/or network entities.

Referring to FIG. 3, at step S300 the MME 108 receives a non access stratum (NAS) service request message from the eNB 105.

As is known and described in 3GPP TS 23.401, the entire contents of which are incorporated herein by reference, when the UE 110 enters the coverage area of the eNB 105, the UE 110 performs an attachment procedure to register with the EPC network (also sometimes referred to herein as the core network (CN)). To initiate the attachment procedure, the UE 110 sends a NAS Attach message to the eNB 105. In response to the received NAS Attach message, the eNB 105 sends the NAS service request message to the MME 108.

As is well-known, as part of a UE NAS service request procedure, the eNB 105 sends the UE NAS request in the "Initial UE Message" to the MME 108. The Initial UE Message includes NAS Service Request, the UE identification information, network identifiers, eNB identification information, and establishment cause. In addition to this well-known information, according to at least this example embodiment the NAS service request message from the eNB 105 includes load condition information for the eNB 105 (also referred to as radio access network (RAN) load condition information). The load condition information may include a messaging overload condition indicator and/or a connected users overload condition indicator for the eNB 105. The messaging overload condition indicator indicates whether the eNB 105 is currently experiencing a messaging overload condition. As is well-known, a messaging overload condition occurs when the quantity of messages offered to the eNB 105 exceeds the level of messages that the eNB is capable of processing without exceeding the resources (e.g., CPU and memory) allocated to the message processing at the eNB 105. The messaging overload condition indicator may be in the form of a flag bit or other well-known indicator value. In one example, if the messaging overload condition indicator is set (e.g., to '1', rather than reset to '0'), then the eNB 105 is experiencing a messaging overload condition.

The connected users overload condition indicator indicates whether the eNB 105 is currently experiencing a connected users overload condition. As is well-known, a connected users overload condition occurs when the quantity of connected users exceeds the number of UEs capable of being supported without denying service to UE service requests or data requests. The connected users overload condition indicator may also be in the form of a flag bit or other indicator value. In one example, if the connected users overload condition indicator is set (e.g., to '1', rather than reset to '0'), then the eNB 105 is experiencing a connected users overload condition.

Returning to FIG. 3, in response receiving the NAS service request message, at step S304 the dormancy timer adjustment parameter calculation circuit 224 retrieves network status and UE activity history information from the memory 240. The UE activity history may include, for example, connection times for N number of most recent RRC connections by the UE 110. In this case, N is a real number greater than zero (0). A connection time refers to a length of time that the UE 110 was connected to the network for a given RRC connection. The UE activity history may also include a number of times the UE 110 has requested a RRC connection in a given time interval. In one example, the time interval may be 1 hour. This is also referred to as the service request rate SR_RATE for the UE 110. The service request rate SR_RATE for the UE 110 may be stored at the memory 240 and updated as necessary. In another example, the MME 108 may calculate the service request rate SR_RATE (e.g., service requests per hour) based on the received number of times the UE 110 has requested an RRC connection and the interval during which the UE 110 requested the RRC connections.

The MME 108 determines RRC connection times from eNBs serving the UE 110 during the well-known signaling release procedure when the RRC connection for the UE 110 is released.

The network status information may include current message loading and UE loading of network elements such as MMEs, SGWs, and PGWs. The network status information may be collected from MME local status information or received from other network elements as is well-known in the art.

Still referring to FIG. 3, at step S306 the dormancy timer adjustment parameter calculation circuit 224 calculates a plurality of dormancy timer adjustment parameters based on the UE activity history and the network status information. The dormancy timer adjustment parameter calculation circuit 224 outputs the plurality of dormancy timer adjustment parameters to the dormancy timer adjustment circuit 222. As mentioned above, the plurality of dormancy timer adjustment parameters include at least a service request rate SR_RATE and a connection time change parameter $\Delta_{CT}$ for the UE 110.

The connection time change parameter $\Delta_{CT}$ refers to a difference between a connection time for a most recent RRC connection (the $N^{th}$ connection) for the UE 110 and an average of the last $(N-1)^{th}$ RRC connections by the UE 110. In other words, the connection time change parameter $\Delta_{CT}$ refers to a difference between a current (or most recent) RRC connection time associated with the received NAS service request message from the UE 110 and an average of a set of N−1 most recent RRC connection times associated with a set of previous NAS service request messages from the UE 110.

In one example, N may be equal to 10. In another example, the average may be calculated based on a number of RRC connections by the UE 110 in a given time interval (e.g., 10 minutes). The MME 108 may store the connection time change parameter $\Delta_{CT}$ for the UE 110 in the memory 240, and update the parameter as necessary.

Each of the plurality of dormancy timer adjustment parameters has a corresponding dormancy timer adjustment parameter threshold value. As discussed in more detail below, the dormancy timer adjustment circuit 222 determines whether to adjust the dormancy timer for the UE based on (i) at least one load condition for the wireless network, and (ii) a comparison between each of the plurality of dormancy timer adjustment parameters and a corresponding one of the plurality of dormancy timer adjustment parameter threshold values. As discussed herein, the dormancy timer (also known as the dormancy timer threshold value) is a length of time (e.g., maximum length of time) during which the UE 110 maintains a RRC connection with the wireless network while the UE 110 is no longer sending or receiving user data traffic. When the dormancy timer for a particular UE and/or RRC connection is triggered, the RRC connection for the UE 110 is released by the eNB 105.

According to at least some example embodiments, the dormancy timer may have a value in the range of between about 1 second and about 20 seconds, inclusive. However, in other example embodiments, the dormancy timer may have values greater than 20 seconds as well. The corresponding dormancy timer adjustment parameter threshold values include a service rate request threshold value SR_THR and a connection time change parameter threshold $\Delta_{CT\_TH}$.

Returning to FIG. 3, at step S308 the dormancy timer adjustment circuit 222 compares the calculated service request rate SR_RATE with the service request rate threshold value SR_THR. The service request rate threshold value SR_THR may be set by a network operator as desired based on empirical data, network conditions, etc. A sample service rate threshold may be set to about 30 service requests per hour.

If the service request rate SR_RATE for the UE 110 is greater than or equal to the service request rate threshold value SR_THR, then at step S312 the dormancy timer adjustment circuit 222 determines whether the eNB 105 is experiencing a messaging overload (i.e., whether the eNB 105 is in a messaging overload state). In at least one example embodiment, the dormancy timer adjustment circuit 222 determines whether the eNB 105 is experiencing a messaging overload based on the messaging overload condition indicator received from the eNB 105 in the NAS service request message at step S300. As discussed above, if the messaging overload condition indicator is set, then the eNB 105 is experiencing a messaging overload condition.

If the eNB 105 is not experiencing a messaging overload condition, then the dormancy timer adjustment circuit 222 determines whether the core network is experiencing a messaging overload condition at step S314. In one example, the MME 108 determines whether the core network is experiencing an overload condition based on CPU usage at the SGW 101, the PGW 103 and/or the MME 108. In one example, the SGW 101 may notify (e.g., based on 3GPP proposed specification) the MME 108 of the messaging overload condition in the core network.

If the dormancy timer adjustment circuit 222 determines that the core network is not experiencing a messaging overload condition at step S314, then the dormancy timer adjustment circuit 222 decreases the dormancy timer for the UE 110. In one example, the dormancy timer adjustment circuit 222 decreases the dormancy timer for the UE 110 incrementally (e.g., by about 1 second).

The MME 108 then sends the decreased dormancy timer to the eNB 105 at step S318. In one example, the MME 108 outputs the decreased dormancy timer to the eNB 105 as part of the Initial Context Setup Request (S1-AP) message from the MME 108 to the eNB 105 during a subsequent initial attachment procedure for the UE 110 (e.g., a next initial attachment procedure for the UE 110). Because the Initial Context Setup Request (S1-AP) message as well as the initial attachment procedure for a UE is well-known, a detailed discussion is omitted.

Returning to step S314, if the dormancy timer adjustment circuit 222 determines that the core network is experiencing a messaging overload condition, then the dormancy timer adjustment circuit 222 increases the dormancy timer for the UE 110 at step S320. In one example, the dormancy timer adjustment circuit 222 increases the dormancy timer for the UE 110 incrementally (e.g., by about 1 second). The MME 108 then outputs the increased dormancy timer to the eNB 105 at step S322. The MME 108 sends the increased dormancy timer to the eNB 105 at step S322 in the same manner as discussed above with regard to step S318.

Returning to step S312, if the dormancy timer adjustment circuit 222 determines that the eNB 105 is experiencing a messaging overload condition, then the dormancy timer adjustment circuit 222 increases the dormancy timer at step S320 in the same manner as discussed above. The MME 108 then outputs the increased dormancy timer for the UE 110 to the eNB 105 at step S322.

Returning to step S308, if the dormancy timer adjustment circuit 222 determines that service request rate SR_RATE is less than the service request rate threshold value SR_THR, then the dormancy timer adjustment circuit 222 compares the connection time change parameter $\Delta_{CT}$ with the connection time change parameter threshold $\Delta_{CT\_TH}$. If the connection time change parameter $\Delta_{CT}$ is less than or equal to the connection time change parameter threshold $\Delta_{CT\_TH}$, then the process proceeds to step S312 and continues as discussed above.

Returning to step S324, if the connection time change parameter $\Delta_{CT}$ is greater than the connection time change parameter threshold $\Delta_{CT\_TH}$, then the dormancy timer adjustment circuit 222 determines whether the eNB 105 is experiencing a connected users overload condition at step S326. The dormancy timer adjustment circuit 222 determines whether the eNB 105 is experiencing a connected users overload condition based on the connected users overload condition indicator received from the eNB 105 in the NAS service request message at step S300.

If the dormancy timer adjustment circuit 222 determines that the eNB 105 is experiencing a connected users overload condition at step S326, then the process proceeds to step S316 and continues as discussed above.

Returning to step S326, if the dormancy timer adjustment circuit 222 determines that the eNB 105 is not experiencing a connected users overload condition, then the process proceeds to step S320 and continues as discussed above.

In one example, the eNB 105 utilizes the adjusted dormancy timer from the MME 108 as the (updated) dormancy timer for a next RRC connection by the UE 110. In this case, when the updated dormancy timer is triggered, the eNB 105 closes or releases that RRC connection with the UE 110. A more detailed discussion of an example manner in which the eNB 105 utilizes the adjusted dormancy timer will be provided below with regard to FIG. 4.

Figure 4:
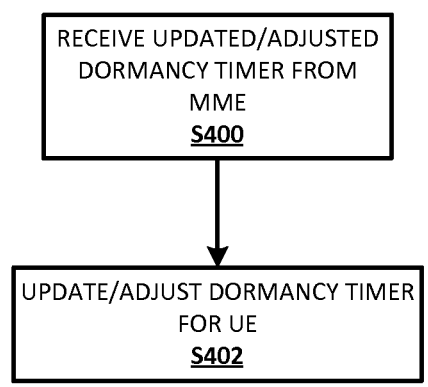
FIG. 4 is a flow chart illustrating an example embodiment of a method for adjusting a dormancy timer for a user equipment (UE).

FIG. 4 is a flow chart illustrating an example embodiment of a method for adjusting a dormancy timer for a UE. The method shown in FIG. 4 will be discussed with regard to the eNB 105 for example purposes.

Referring to FIG. 4, at step S400 the eNB 105 receives the adjusted dormancy timer from the MME 108. The adjusted dormancy timer may be an increased or a decreased dormancy timer as discussed above with regard to FIG. 3.

At step S402, the eNB 105 adjusts the dormancy timer for the UE 110 according to the received dormancy timer from the MME 108. The eNB 105 then utilizes the updated dormancy timer to determine when to release the RRC connection between the UE 110 and the eNB 105. The eNB 105 may store (at least temporarily) the received dormancy timer for the UE 110 in association with identification information for the UE 110. According to at least some example embodiments, the identification information may include a temporary identifier for the UE 110 provided by the MME 108 during the attach procedure for the UE 110.

Although example embodiments are discussed herein with regard to a single UE 110 in at least some cases, it should be understood that the same or substantially the same methodology may be applied to any number of UEs (e.g., each UE) connected to a given eNB (e.g., eNB 105). In this instance, the eNB may store dormancy timer values for each UE connected to the eNB until the RRC connection with the respective UE is released. Upon release of the RRC connection for a UE, the eNB may disregard the dormancy timer value for that RRC connection and UE.

The eNB 105 may be structured in the same or a similar manner as the MME 108 shown in FIG. 2. In this regard, the eNB 105 may include: a memory; an eNB processing circuit; and communication interfaces.

Unlike the conventional art, according to at least some example embodiments the MME 108 determines dormancy timer values on a per-UE and/or per-RRC connection basis. The determined dormancy timer values for UEs attached to the eNB 105 are sent to the eNB 105, and the eNB 105 utilizes the determined dormancy timer values to determine when to release RRC connections for the UEs individually based on their respective dormancy timer values. The dormancy timer values for one or more UEs may be different.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method for improving wireless network capacity, the method comprising:

calculating, at a core network entity processing circuit, a plurality of dormancy timer adjustment parameters in response to a received service request from at least one user equipment being served by a base station, the plurality of dormancy timer adjustment parameters including a service request rate and connection time change parameter for the at least one user equipment;

adjusting, at the core network entity processing circuit, a dormancy timer for the at least one user equipment based on (i) at least one load condition for the wireless network, and (ii) a comparison between each of the plurality of dormancy timer adjustment parameters and a corresponding one of a plurality of dormancy timer adjustment parameter threshold values; and outputting, by a communication interface, the adjusted dormancy timer to the base station serving the at least one user equipment, wherein
the at least one user equipment is only a subset of user equipments being served by the base station, and
the connection time change parameter is indicative of a difference between a current connection time associated with the received service request and an average of a set of connection times associated with a set of previous service requests from the at least one user equipment.

2. The method of claim 1, wherein the calculating step comprises:
computing the service request rate and the connection time change parameter based on a signaling event history for the at least one user equipment.

3. The method of claim 1, wherein:
the at least one load condition for the wireless network includes at least one of (i) an overload condition at the base station serving the at least one user equipment and (ii) an overload condition at a core network entity; and
the overload condition at the base station is one of (i) a connected users overload condition and (ii) a messaging overload condition.

4. The method of claim 1, further comprising:
comparing the service request rate with a first of the plurality of dormancy timer adjustment parameter threshold values;
determining whether the wireless network is experiencing an overload condition; and
wherein the adjusting step includes,
increasing the dormancy timer for the at least one user equipment if the service request rate is greater than the first of the plurality of dormancy timer adjustment parameter threshold values and the wireless network is experiencing the overload condition.

5. The method of claim 1, further comprising:
comparing the service request rate with a first of the plurality of dormancy timer adjustment parameter threshold values;
determining whether the wireless network is experiencing an overload condition; and
wherein the adjusting step includes,
decreasing the dormancy timer for the at least one user equipment if the service request rate is greater than the first of the plurality of dormancy timer adjustment parameter threshold values and the wireless network is not experiencing the overload condition.

6. The method of claim 1, further comprising:
comparing the service request rate with a first of the plurality of dormancy timer adjustment parameter threshold values;
comparing the connection time change parameter with a second of the plurality of dormancy timer adjustment parameter threshold values;
determining whether the wireless network is experiencing an overload condition; and
wherein the adjusting step includes,
increasing the dormancy timer for the at least one user equipment if (i) the service request rate is less than the first of the plurality of dormancy timer adjustment parameter threshold values, (ii) the connection time change parameter is less than the second of the plurality of dormancy timer adjustment parameter threshold values, and (iii) the wireless network is experiencing the overload condition.

7. The method of claim 1, further comprising:
comparing the service request rate with a first of the plurality of dormancy timer adjustment parameter threshold values;
comparing the connection time change parameter with a second of the plurality of dormancy timer adjustment parameter threshold values;
determining whether the base station serving the at least one user equipment is experiencing a connected users overload condition; and
wherein the adjusting step includes,
increasing the dormancy timer for the at least one user equipment if (i) the service request rate is less than the first of the plurality of dormancy timer adjustment parameter threshold values, (ii) the connection time change parameter is greater than the second of the plurality of dormancy timer adjustment parameter threshold values, and (iii) the base station serving the at least one user equipment is not experiencing the connected users overload condition.

8. The method of claim 1, further comprising:
comparing the service request rate with a first of the plurality of dormancy timer adjustment parameter threshold values;
comparing the connection time change parameter with a second of the plurality of dormancy timer adjustment parameter threshold values;
determining whether the base station serving the at least one user equipment is experiencing a connected users overload condition; and
wherein the adjusting step includes,
decreasing the dormancy timer for the at least one user equipment if (i) the service request rate is less than the first of the plurality of dormancy timer adjustment parameter threshold values, (ii) the connection time change parameter is greater than the second of the plurality of dormancy timer adjustment parameter threshold values, and (iii) the base station serving the at least one user equipment is experiencing the connected users overload condition.

9. An evolved packet core network entity, comprising:
a core network entity processing circuit configured to,
calculate a plurality of dormancy timer adjustment parameters in response to a received service request from at least one user equipment being served by a base station, the plurality of dormancy timer adjustment parameters including a service request rate and connection time change parameter for the at least one user equipment, and
adjust a dormancy timer for the at least one user equipment based on (i) at least one load condition for a wireless network, and (ii) a comparison between each of the plurality of dormancy timer adjustment parameters and a corresponding one of a plurality of dormancy timer adjustment parameter threshold values;
a memory operatively connected to the core network entity processing circuit, the memory being configured to store at least one of the plurality of dormancy timer adjustment parameters; and a communication interface operatively coupled to the core network entity processing circuit, the communication interface being configured to output the adjusted dormancy timer to the base station serving the at least one user equipment, wherein
the at least one user equipment is only a subset of user equipments being served by the base station, and
the connection time change parameter is indicative of a difference between a current connection time associated with the received service request and an average of a set of connection times associated with a set of previous service requests from the at least one user equipment.

10. The core network entity of claim 9, wherein the dormancy timer is a maximum length of time during which the at least one user equipment maintains a connection with the wireless network while the at least one user equipment is inactive.

11. The core network entity of claim 9, wherein the core network entity processing circuit is further configured to compute the service request rate and the connection time change parameter based on a signaling event history for the at least one user equipment.

12. An evolved packet core network entity, comprising:
a core network entity processing circuit configured to,
calculate a plurality of dormancy timer adjustment parameters in response to a received service request from a user equipment, the plurality of dormancy timer adjustment parameters including a service request rate and connection time change parameter for the user equipment, and
adjust a dormancy timer for the user equipment based on (i) at least one load condition for a wireless network, and (ii) a comparison between each of the plurality of dormancy timer adjustment parameters and a corresponding one of a plurality of dormancy timer adjustment parameter threshold values;
a memory operatively connected to the core network entity processing circuit, the memory being configured to store at least one of the plurality of dormancy timer adjustment parameters; and
a communication interface operatively coupled to the core network entity processing circuit, the communication interface being configured to output the adjusted dormancy timer to a base station serving the user equipment, wherein
the connection time change parameter is indicative of a difference between a current connection time associated with the received service request and an average of a set of connection times associated with a set of previous service requests from the user equipment.

13. The core network entity of claim 9, wherein the at least one load condition for the wireless network includes at least one of (i) an overload condition at the base station serving the at least one user equipment and (ii) an overload condition at the core network entity.

14. The core network entity of claim 13, wherein the overload condition at the base station is one of (i) a connected users overload condition and (ii) a messaging overload condition.

15. The core network entity of claim 9, wherein the core network entity processing circuit is further configured to,
compare the service request rate with a first of the plurality of dormancy timer adjustment parameter threshold values,
determine whether the wireless network is experiencing an overload condition, and
increase the dormancy timer for the at least one user equipment if the service request rate is greater than the first of the plurality of dormancy timer adjustment parameter threshold values and the wireless network is experiencing the overload condition.

16. The core network entity of claim 9, wherein the core network entity processing circuit is further configured to,
compare the service request rate with a first of the plurality of dormancy timer adjustment parameter threshold values,
determine whether the wireless network is experiencing an overload condition, and
decrease the dormancy timer for the at least one user equipment if the service request rate is greater than the first of the plurality of dormancy timer adjustment parameter threshold values and the wireless network is not experiencing the overload condition.

17. The core network entity of claim 9, wherein the core network entity processing circuit is further configured to
compare the service request rate with a first of the plurality of dormancy timer adjustment parameter threshold values,
compare the connection time change parameter with a second of the plurality of dormancy timer adjustment parameter threshold values,
determine whether the wireless network is experiencing an overload condition, and
increase the dormancy timer for the at least one user equipment if (i) the service request rate is less than the first of the plurality of dormancy timer adjustment parameter threshold values, (ii) the connection time change parameter is less than the second of the plurality of dormancy timer adjustment parameter threshold values, and (iii) the wireless network is experiencing the overload condition.

18. The core network entity of claim 9, wherein the core network entity processing circuit is further configured to,
compare the service request rate with a first of the plurality of dormancy timer adjustment parameter threshold values,
compare the connection time change parameter with a second of the plurality of dormancy timer adjustment parameter threshold values,
determine whether the base station serving the at least one user equipment is experiencing a connected users overload condition, and
increase the dormancy timer for the at least one user equipment if (i) the service request rate is less than the first of the plurality of dormancy timer adjustment parameter threshold values, (ii) the connection time change parameter is greater than the second of the plurality of dormancy timer adjustment parameter threshold values, and (iii) the base station serving the at least one user equipment is not experiencing the connected users overload condition.

19. The core network entity of claim 9, wherein the core network entity processing circuit is further configured to,
compare the service request rate with a first of the plurality of dormancy timer adjustment parameter threshold values,
compare the connection time change parameter with a second of the plurality of dormancy timer adjustment parameter threshold values, determine whether the base station serving the at least one user equipment is experiencing a connected users overload condition, and decrease the dormancy timer for the at least one user equipment if (i) the service request rate is less than the first of the plurality of dormancy timer adjustment parameter threshold values, (ii) the connection time change parameter is greater than the second of the plurality of dormancy timer adjustment parameter threshold values, and (iii) the base station serving the at least one user equipment is experiencing the connected users overload condition.

\* \* \* \* \*